April 18, 1939.  C. BREER ET AL  2,154,561
CUSHION TESTING APPARATUS
Filed July 12, 1937  3 Sheets-Sheet 3
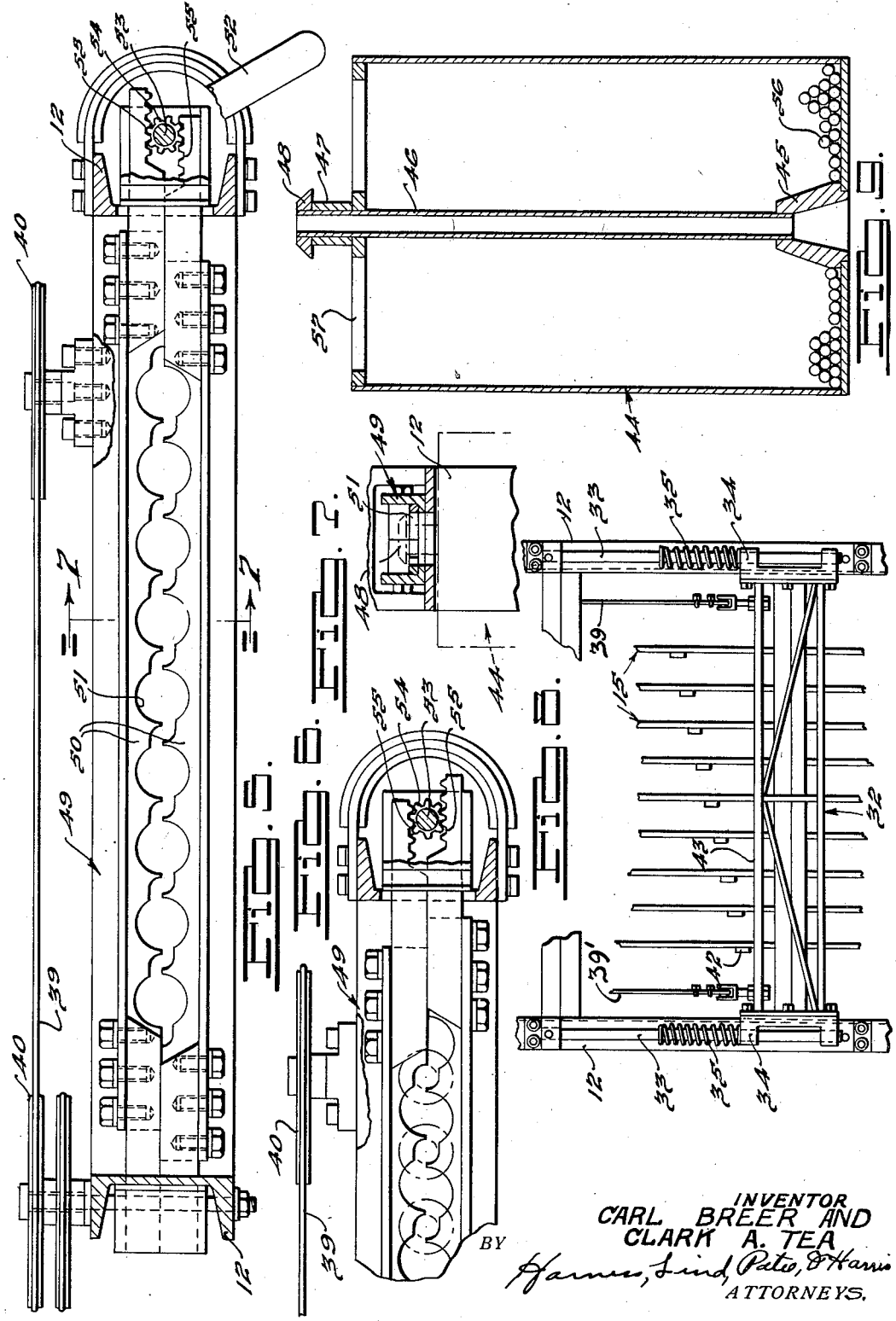
INVENTOR
CARL BREER AND
CLARK A. TEA
ATTORNEYS.

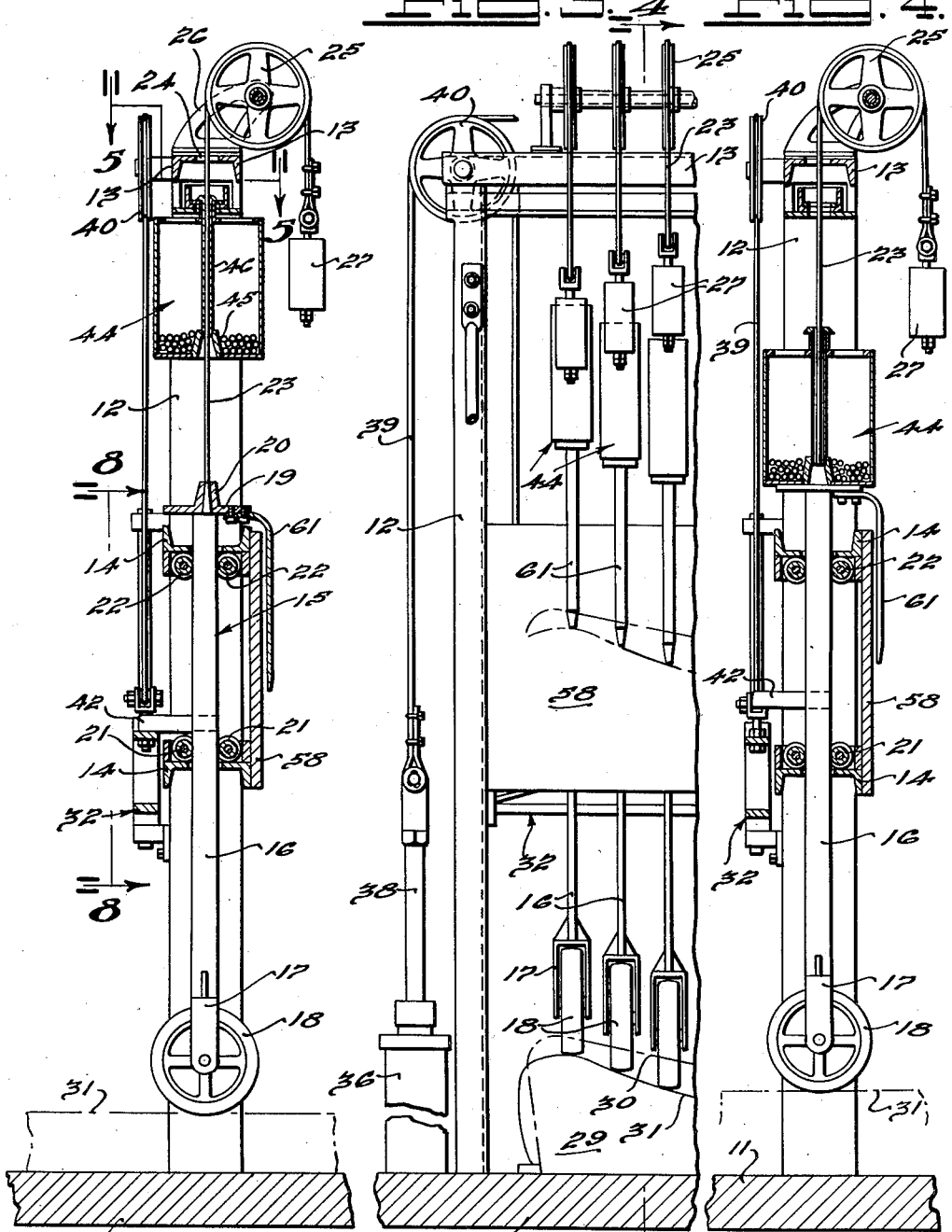

Patented Apr. 18, 1939

2,154,561

UNITED STATES PATENT OFFICE 2,154,561

CUSHION TESTING APPARATUS

Carl Breer, Grosse Pointe Park, and Clark A. Tea, Detroit, Mich., assignors to Chrysler Corporation, Detroit, Mich., a corporation of Delaware Application July 12, 1937, Serial No. 153,172

9 Claims. (Cl. 73—51)

This invention relates to improved apparatus for testing seat cushions, mattresses, and the like. More partciularly the invention pertains to improved testing apparatus by which can be ascertained the normal relaxed contour and deflection contour of resilient weight supporting structures of the foregoing character.

One of the main objects of the invention is the provision of apparatus of this kind for determining whether the normal relaxed contour of cushions, mattresses and the like and the deflection contours under selected weight distributions corresponding to the average load to which they are subjected in use, conforms with predetermined standards.

Another object of the invention is to provide apparatus of this character which visually depict the departure of successively adjacent portions of such cushion members from predetermined, desired, relaxed and loaded contours, respectively.

A further object of the invention is to provide a testing machine of this kind which may be conveniently conditioned to test cushion structures of diverse sizes and having different selected deflecting characteristics.

Other objects of the invention are to provide a simple and inexpensive testing machine from which results may be obtained by unskilled workmen; to provide a testing machine of this character which is adapted to meet the fast operation requirement of modern high speed production line practice; and to provide a cushion structure testing machine which is adapted to indicate both the relaxed and load contours in directions transverse and longitudinally of the cushion.

An illustrative embodiment of the invention is shown in the accompanying drawings, in which:

Fig. 2 is a transverse vertical sectional view taken on the line 2—2 of Fig. 1.

Fig. 3 is a fragmentary, front elevational view, similar to Fig. 1, but showing the parts of the testing machine in changed positions.

Fig. 4 is a transverse, vertical sectional view taken on the line 4—4 of Fig. 3.

Fig. 5 is a horizontal sectional view taken on the line 5—5 of Fig. 2.

Fig. 6 is a fragmentary horizontal sectional view, similar to Fig. 5, but showing the parts of the machine in different positions.

Fig. 7 is a fragmentary, transverse vertical sectional view taken on line 7—7 of Fig. 5.

Fig. 8 is a fragmentary, rear side elevational view showing a portion of the machine as viewed from the plane indicated by the line 8—8 of Fig. 2.

Fig. 9 is an enlarged central sectional view of a weight structure employed in the improved testing machine.

Figure 1:
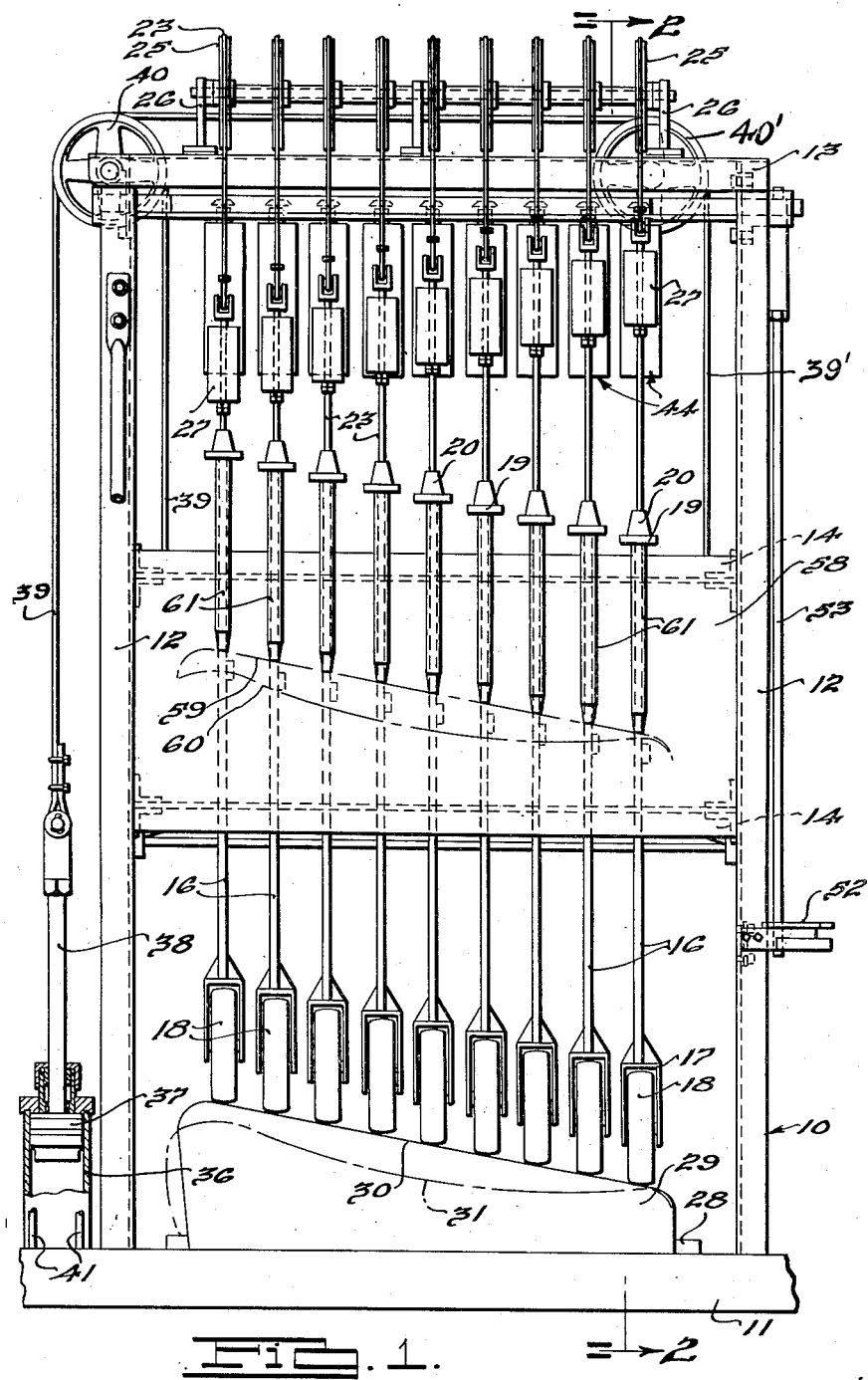
Fig. 1 is a front elevational view, partly in section, of a testing machine embodying the invention.

In the form of the invention illustrated in the drawings, the testing apparatus includes a frame structure, generally designated by the numeral 10, having a base portion 11 on which are mounted spaced vertically upstanding side rails 12. The side rails 12 are rigidly connected together by a substantially horizontal channel member 13 which is attached to their upper extremities. Extending between the side rails 12 of the frame structure 10 are a pair of vertically spaced, transversely extending channel bars 14 having registering apertures therein in which are slidably mounted a plurality of laterally spaced cushion contacting members, generally designated by the numeral 15. The cushion contacting members 15, and means hereinafter set forth by which they are operated, are substantially identical and therefore a description of one cushion contacting member and its associated structure will serve for all. Each cushion contacting member 15 comprises a bar portion 16 having a bifurcated lower end 17 on which a rolling contact member, preferably comprising a wheel 18, is journalled. Mounted on the upper end portion of each rod 16 is a plate 19 having an upwardly extending frusto-conical, centrally located projection 20.

Vertical reciprocatory movement of each contacting member 15 is guided by pairs of rollers 21 and 22 mounted on the cross members 14, as illustrated in Fig. 2. A flexible cable 23 rigidly attached to the plate 19 of each cushion contacting member 15, extends upwardly through an opening 24 in the horizontal bar 13 of the frame structure and passes over a pulley 25 rotatably supported by a bracket 26 mounted on the bar 13. A counter-weight 27 secured to the upper end portion of the cable 23 is provided for substantially balancing the weight of each cushion contacting member 15 and the apparatus associated therewith, the weight 27 being sufficiently lighter than the opposing weight to enable the members 15 to descend when released.

The cushion to be tested is preferably movably supported on the base portion 11 of the frame structure 10 and confined between spaced cleats 28 mounted on the base 11 in order to guide the movement of the cushion. In the drawings the cushion under examination is designated by the numeral 29, the relaxed contour of the cushion being illustrated by full lines 30 and the deflection contour of the cushion under load being illustrated by the dot and dash line 31. The cushion contacting members 15 may be raised by a frame structure, generally designated by the numeral 32 in Fig. 8, to accommodate placement of the cushion 29 upon the support 11 and removal of the cushion therefrom. The frame structure 32 extends transversely of the main frame 10 of the machine and is reciprocably mounted on bars 33 secured at their extremities to the rear edges of the side rails 12. Brackets 34 secured to the opposite extremities of the frame 32 are slidably mounted on the bars 33 which extend through apertures in the bracket. Springs 35 surrounding and slidably mounted upon the bars 33 serve to cushion upward movement of the frame 32.

The frame 32 may be reciprocated mechanically by fluid pressure apparatus comprising a cylinder 36, piston 37, and piston rod 38, mounted adjacent the external side of one side rail 12 of the frame structure 10. The piston rod 38 of the fluid pressure apparatus is connected to one lateral end portion of the frame 32 by a flexible cable 39 extending over a pulley 40 mounted on the upper edge portion of the frame 10 and to the other lateral end portion of the frame 32 by a flexible cable 39′ extending over the pulley 40 and over a pulley 40′ mounted on the opposite upper edge portion of the frame 10. The cylinder 36 of the fluid pressure operating apparatus is preferably supplied with fluid under pressure from a source (not shown) through the conduits 41. Each cushion contacting member 15 is provided with a rearwardly extending lug 42 which is engageable with the upper bar 43 of the frame 32 and adapted to seat upon the frame bar 43 when the frame 32 is raised.

When the frame 32 is in its lowermost position, as illustrated in Fig. 8, the cushion contacting members 15 fall to their lowermost position and seat upon the occupant supporting surface of the cushion 29.

Each cushion contacting member 15 is provided with a weight, generally designated by the numeral 44, which comprises a hollow container having a socket portion 45 in its lower extremity in which the projection 20 of the plate 19 of the contacting member is receivable. The weight containers 44 are provided with central tubes 46 through which the cables 23 extend. Mounted on the upper end of each tube 46 of the weights 44 is a head portion comprising a sleeve 47 surrounding an external end portion of the tube 46 and a washer 48 having a conical shaped periphery and which is rigidly attached to the outer end portion of the tube 46.

The foregoing head portions with which the tubes 46 of the weights are provided adapt the weights to be releasably supported in suspending relation by releasable supporting means shown in Fig. 5 and designated generally by the numeral 49. This releasable supporting apparatus is mounted on the upper end portion of the frame structure 10 immediately below the top cross member 13 thereof and comprises a pair of laterally shiftable plates 50 having complementary aperture portions 51 therein which are adapted to receive the head portions comprising the washer 48 of the weights 44. The plates 50 may be shifted in respectively opposite directions in order to position the apertured portions 51 thereof so as to selectively retain or release the weights, by operation of a lever 52 which is secured to a shaft 53 on which a pinion 54 is mounted. The pinion 54 has teeth which are meshed with rack teeth 55 formed on the right end portions of the shiftable plates 50, as viewed in Fig. 5. Rotation of the handle 52 in one direction brings the aperture portions to the plate 50 into misalignment with each other in order to releasably hold the weights in the positions illustrated in Figs. 1 and 2. When the handle 52 is turned in the opposite directions, the aperture portions of the plates 50 are brought into registration with each other in order to release the weights.

The weights are not normally released until the cushion contacting members 15 have been raised to their uppermost position in order to seat the weights on the upper end plates 19 thereof. The magnitude of the weights 44 may be selectively predetermined by pouring shot 56, or other suitable material, into the interior of the weight containers through the openings 57 in the upper end portions thereof. Each cushion contacting member may therefore be conditioned to apply on the portion of the occupant supporting side of the cushion with which it registers, a selected load corresponding to the load applied thereon by an average occupancy load distribution. When the cushion contacting members are so weighted, the upper side of the cushion 29 is deflected to a position corresponding to that shown in dot and dash lines in Fig. 1.

Mounted on the front side of the frame structure 10 is a plate 58 having a graph thereon designated by the numeral 59 which represents a standard contour desired on the occupant supporting side of the cushion when the latter is unloaded and relaxed. A curve 60 is also provided on the plate 58 to represent a selected deflection contour on the upper side of the cushion when the latter is subjected to average occupancy load distribution. Each cushion contacting member 15 has a pointer 61 mounted on its upper end plate 19 and extending in advance of the front side of the plate 58. The lower end portions of the pointers 61 are adapted to coincide with the curve 59 when the cushion contacting members are unweighted and seated upon a cushion which meets the predetermined standards of relaxed contour. The lower ends of the pointers 61 are adapted to coincide with the curve 60 when the contact members are weighted and seated upon a cushion which meets the predetermined average load deflection standard.

In the operation of the foregoing testing machine, the cushion 29 may be placed so as to bring the cushion contacting members 15 into engagement with any selected portion thereof, or the cushion may be moved lengthwise in a direction transverse to the direction of alignment of the cushion contacting members in order to bring all portions thereof under the members 15 for examination. If desired, the cushion may be disposed with its length substantially parallel to the alignment of the contacting members rather than transversely of the direction of alignment thereof and the curves 59 and 60 may be correspondingly formed to represent standards of relaxed and loaded contours.

During any of the foregoing modes of operation of the machine, the contacting elements are lifted by the pneumatic lifting apparatus to accommodate positioning of the cushion on the support 11. Then the contacting members 15 are lowered by operation of the pneumatic apparatus while the weights are supported, independently of the contacting members, by the plates 50. After the lower end portions of the contacting members 15 have seated upon the upper side of the cushion 29, the pointers 61 and curve 59 may be observed to determine the extent of departure, if any, of successively adjacent portions of the cushion from a predetermined contour represented by the curve 59. After this examination, the contacting members are again raised by the fluid pressure apparatus until the upper end plates 19 thereof engage the lower extremities of the weights 44. Then the operating handle 52 is manipulated to release the weights and permit them to be supported on the upper end portions of the cushion contacting members. The fluid pressure apparatus is actuated to permit lowering of the cushion contacting members by allowing the frame 32 to descend and the lower end portions of the thus weighted contacting members are brought into engagement with the upper side of the cushion 29, as illustrated in Fig. 3. The weighted contacting members subject the occupant supporting side of the cushion to a load distribution corresponding to the average calculated occupancy load to which the cushion is subjected in normal use and the cushion is deflected accordingly. The amount of the departure, if any, of the occupant supporting side of the cushion from a predetermined standard curvature, as represented by the curve 60 may then be noted by observation of the curve 60 and the associated lower end portions of the pointers 61. By moving a seat cushion or other cushion elements, such as a mattress for example, longitudinally or widthwise under the cushion contacting members 15, all successively adjacent portions thereof may be subjected to the foregoing tests.

This machine is so constructed that it may be expeditiously employed in a production line to ascertain whether or not cushions come within predetermined limits in both relaxed and normal loaded contours. Inasmuch as the relaxed and loaded curvatures of the cushions reflect structural characteristics such as resiliency and hardness, examination of cushions with the aid of this apparatus shows up various defects. The testing machine is simple in its operation and capable of being used to advantage by unskilled workmen.

Although but one specific embodiment of our invention is herein shown and described, it will be understood that various changes in the size, shape and arrangement of parts may herein be made without departing from the spirit of our invention.

We claim:

1. Cushion testing apparatus comprising a frame structure, a support for a cushion under examination, a plurality of cushion contacting members shiftably mounted on said frame structure, each respectively engageable with successively adjacent portions of the occupants supporting side of said cushion, a chart adjacent said frame structure having a graph thereon representing the desired contour of said supporting side of said cushion, indicating means, one operable by each of said cushion contacting members respectively for indicating on said chart the departure of said portions of said supporting side from said desired contour, and means for alternatively placing said cushion contacting members under predetermined loads and for unloading the same respectively.

2. Cushion testing apparatus comprising a frame structure, a support for a cushion under examination, a plurality of cushion contacting members shiftably mounted on said frame structure, each respectively engageable with successively adjacent portions of the occupant supporting side of said cushion, a chart adjacent said frame structure having a graph thereon representing the desired relaxed contour of said side of said cushion, means for counterbalancing each of said cushion contacting members so as to relieve said cushion from supporting the weight thereof while said members are in contact therewith, and indicating means, one associated with each of said cushion contacting members respectively for separately indicating on said chart the departure of said portions of said occupant supporting side from said desired contour.

3. Cushion testing apparatus comprising a frame structure, a plurality of cushion contacting members shiftably mounted on said frame structure each including a rolling contact element engageable respectively with substantially aligned successively adjacent portions of the occupant supporting side of said cushion, a support for said cushion adapted to movably support the latter in contact with said elements and to accommodate movement thereof in a direction transverse to the alignment of said successively adjacent portions of said cushion while said elements are in engagement therewith, means adjacent said contacting members for visually depicting a representation of the desired contour of said occupant supporting side of said cushion, and indicating members, one operable by each of said cushion contacting members respectively for indicating on said contour depicting means the departure of said portions of said cushion from said desired contour during movement of said cushion relative to said contacting members.

4. Cushion testing apparatus comprising a frame structure, a plurality of cushion contacting members shiftably mounted on said frame structure each including a rolling contact element engageable respectively with substantially aligned successively adjacent portions of the occupant supporting side of said cushion, a support for said cushion adapted to movably support the latter in contact with said elements and to accommodate movement thereof in a direction transverse to the alignment of said successively adjacent portions of said cushion while said elements are in engagement therewith, means adjacent said contacting members for visually depicting a representation of the desired relaxed contour of said occupant supporting side of said cushion, apparatus for counterbalancing said contacting members so as to relieve said cushion from supporting the weight thereof while said contacting members are in engagement therewith, and indicating members, one operable by each of said cushion contacting members respectively for indicating on said contour depicting means the departure of said portions of said cushion from said desired contour during movement of said cushion relative to said contacting members.

5. Cushion testing apparatus comprising a frame structure, a support for a cushion under examination, a plurality of cushion contacting members shiftably mounted on said frame structure, each respectively engageable with successively adjacent portions of the occupant supporting side of said cushion, means for loading said members, said means being so constructed and arranged as to apply on said portions loads corresponding to the average occupancy loads thereon, means for depicting a representation of the desired average occupancy load distribution deflection of said side of said cushion, and indicating members, one operable by each of said contacting members respectively for indicating on said contour depicting means the departure of said portions of the supporting side of said cushion from said desired contour when said cushion is under a load distribution corresponding to the average occupancy load distribution thereon.

6. Cushion testing apparatus comprising a frame structure, a plurality of cushion contacting members shiftably mounted on said frame structure each including a rolling contact element engageable respectively with substantially aligned successively adjacent portions of the occupant supporting side of said cushion, said members being weighted and so constructed and arranged as to apply on said cushion portions loads corresponding to the average occupancy loads thereon, a support for said cushion adapted to movably support the latter in contact with said elements and to accommodate movement thereof in a direction transverse to the alignment of said successively adjacent portions of said cushion while said elements are in engagement therewith, means for depicting a representation of the desired average occupancy load distribution deflection of said side of said cushion, and indicating members, one operable by each of said contacting members respectively for indicating on said contour depicting means the departure of said portions of the supporting side of said cushion from said desired contour when said cushion is under a load distribution corresponding to the average occupancy load distribution thereon.

7. Cushion testing apparatus comprising a frame structure, a plurality of cushion contacting members shiftably mounted thereon, a support for so positioning a cushion as to bring its occupant supporting side into registration with said contacting members, means for counterbalancing each of said contacting members to relieve said cushion from supporting the weight thereof while said members are in contact therewith, means for depicting a representation of the desired relaxed contour of said cushion and a representation of the desired average occupancy load distribution deflection of said side of said cushion respectively, means for conditioning said contacting members to apply on portions of said cushion loads corresponding to the average occupancy loads thereon, and indicating members, one associated with each of said contacting members for indicating on said contour depicting means the departure of portions of said cushion from said relaxed and loaded contours.

8. Cushion testing apparatus comprising a frame structure, a plurality of cushion contacting members shiftably mounted thereon, a support for so positioning a cushion as to bring its occupant supporting side into registration with said contacting members, means for counterbalancing each of said contacting members to relieve said cushion from supporting the weight thereof while said members are in contact therewith, means for depicting a representation of the desired relaxed contour of said cushion and a representation of the desired average occupancy load distribution deflection of said side of said cushion respectively, means for conditioning said contacting members to apply on portions of said cushion loads corresponding to the average occupancy loads thereon, indicating members, one associated with each of said contacting members for indicating on said contour depicting means the departure of portions of said cushion from said relaxed and loaded contours, and apparatus for selectively rendering said conditioning means operative and inoperative respectively.

9. Apparatus for testing a cushion comprising a frame structure, a plurality of cushion contacting members shiftably mounted thereon each including a rolling contact element engageable respectively with substantially aligned successively adjacent portions of the occupant supporting side of said cushion, a support for said cushion adapted to movably support the latter in contact with said elements and to accommodate movement thereof in a direction transverse to the alignment of said adjacent portions of said cushion while said elements are in contact therewith, means for counterbalancing each of said contacting members to relieve said cushion from supporting the weight thereof while said members are in contact therewith, means for depicting a representation of the desired relaxed contour of said cushion and a representation of the desired average occupancy load distribution deflection of said side of said cushion respectively, means for conditioning said contacting member to apply on said portions of said cushion loads corresponding to the average occupancy loads thereon, and indicating members, one associated with each of said contacting members for indicating on said contour depicting means the departure of said portions of said cushion from said relaxed and loaded contours.

CARL BREER.
CLARK A. TEA.